Jan. 4, 1966

H. D. BOYD 3,226,874

FISH LURES

Filed June 29, 1964

INVENTOR.
HAROLD D. BOYD
BY

ATTORNEY

United States Patent Office 3,226,874
Patented Jan. 4, 1966

3,226,874
FISH LURES
Harold D. Boyd, 1009 Sunset Road, McCook, Nebr.
Filed June 29, 1964, Ser. No. 378,594
4 Claims. (Cl. 43—42.06)

This invention relates to a fish lure. Fish lures are generally provided with permanently attached hooks which make it necessary to remove the lures from the line when not in use to prevent damage from the hooks.

The principal object of this invention is to provide a plastic item similar to a fish lure which can be adjusted to completely cover the point of the hook when not in use so that the item may remain in place on the line when out of service and yet will eliminate the danger and inconvenience usually caused by unprotected fish hooks.

Another object of the invention is to provide an item of this type with an attachment clip or snap by means of which it may be snapped onto the line or in a pocket for carrying purposes.

A further object is to so design the item that it will serve as a fish lure provided with a hook which can be concealed in a protected position when not in use and projected therefrom to a use position when desired for use.

Other objects and advantages reside in the detail construction of the invention, which is designed for simplicity, economy, and efficiency and will become more apparent from the following description of the invention.

In the following detailed description of the invention, reference is made to the accompanying drawing which forms a part hereof. Like numerals refer to like parts in all views of the drawing and throughout the description.

Figure 1:
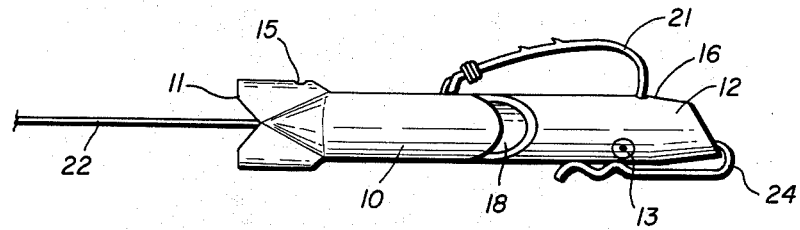
FIG. 1 is a side view of the improved lure showing the hook in the concealed, protected position.

The item, which will be herein designated as a "fish lure," comprises a hollow, tubular, plastic body 10 having a relatively wide, vertical, flattened tail portion 11 of greater width than the body and a tapered head portion 12. The tail portion 11 is notched, as indicated at 27, to present the silhouette of a fish's tail. The head portion 12 may be colored and provided with simulated eyes 13, which, in combination with the flattened tail portion 11, create the appearance of a minnow.

The upper half of the tail portion is vertically and longitudinally slotted to form an upper hook slot 14 having an enlarged terminal socket 15 to receive a fish hook 21 when the latter is desired for use. The top of the head portion 12 is also vertically and longitudinally slotted to form a head slot 16, which also terminates in an enlargement or socket 17 to receive the hook when the latter is in the protected, out-of-use position of FIG. 1.

A diagonal notch 18 is formed in the side of the body and extends to the center line at both the top and bottom of the body. The diagonal notch decreases in width and curves rearwardly to a hook receiving terminus 23 at the top of the body and, at the bottom of the body, the diagonal notch joins a line slot 19 leading rearwardly to a lower slot 20 formed in the lower portion of the tail portion 11.

Figure 3:
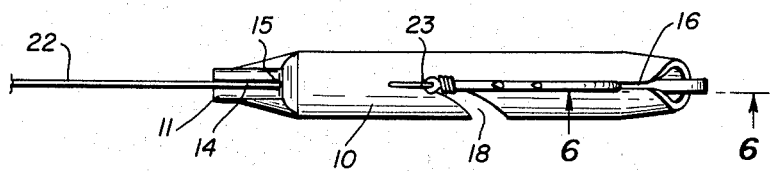
FIG. 3 is a top view of the lure with the hook in the concealed position of FIG. 1.

To place the hook 21 on the body in the protected position of FIGS. 1 and 3, the pointed extremity of the hook is forced rearwardly through the head slot 16 until it engages in the terminal socket 17 therein. Then the snell or leader of the hook shown at 22 is pulled sidewise through the diagonal notch 18, into the interior of the body through the slots 19 and 20. The leader 22 is then drawn rearwardly from the tail portion 11 to pull the hook eye downwardly against the hook-receiving terminus 23 which locks the hook in place with its point concealed as shown in FIGS. 1 and 3.

Figure 2:
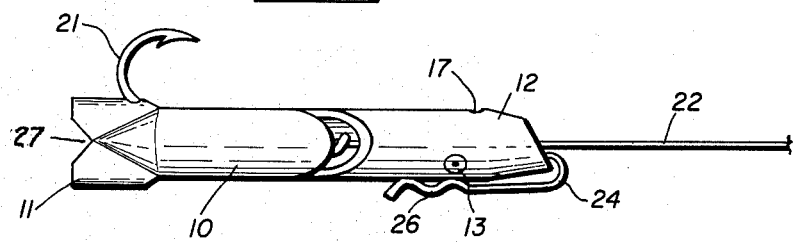
FIG. 2 is a similar side view showing the hook in the exposed position for use.
Figure 4:
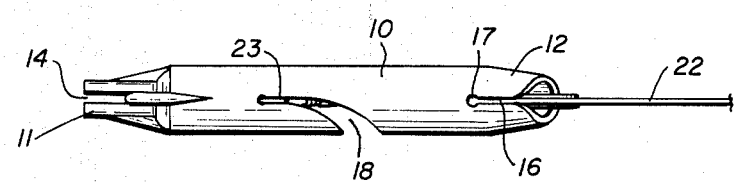
FIG. 4 is a top view thereof with the hook in the exposed position of FIG. 2.
Figure 5:
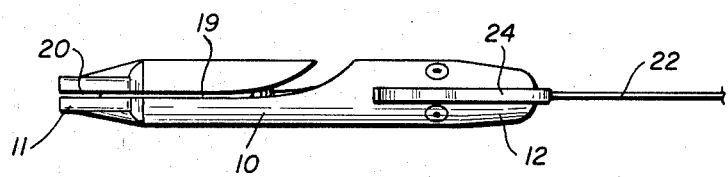
FIG. 5 is a bottom view thereof with the hook in the exposed position of FIG. 4.
Figure 6:
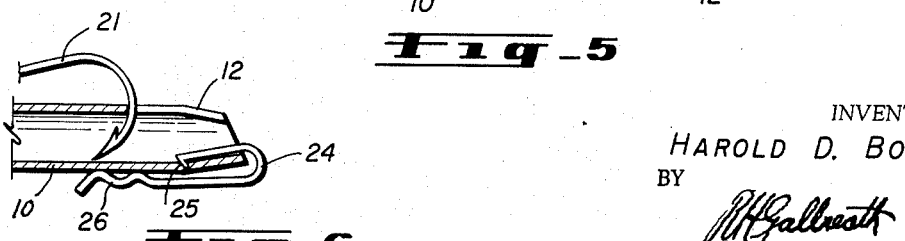
FIG. 6 is a detail, longitudinal section through the front of the lure, taken on the line 6—6, FIG. 3.

To place the hook in the exposed-for-use position of FIGS. 2 and 4, the leader 22 is inserted into the center of the tail portion 11 and passed forwardly through the body so as to project forwardly from the head portion 12. The bend of the hook 21 is then forced forwardly in the upper hook slot 14 in the tail portion until it engages in the terminal socket 15 which locks it in the projected position of FIG. 2 to form a complete fish lure ready for use.

A U-shaped spring clip or snap 24, somewhat similar to the snaps used for holding a fountain pen and the like in a pocket, has its inner extremity inserted in the open front of the head portion 12 and is permanently secured therein by a hooked extremity 25 which is indented into the plastic of the lure. The outer extremity of the snap 24 is tightly gripped against the lure by the inherent resiliency of the snap and is preferably provided with gripping corrugations 26. The snap will retain the lure, with the hook in the protected position, in a pocket or pouch or will allow one or more of the lures to be snapped on the line and carried with the fishing rod without danger of hook entanglement.

The lure may be made in any desired size and the hooks may be any of the conventional single point types. For stream fishing, it is preferred to have the lure 2½" long and ⅜" in diameter with a #1 down-eye, bait-holder hook.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A hook-protecting fishing item comprising: an elongated, tubular, plastic body; a flat tail portion on said body; an open-fronted head portion on said body; a hook slot extending rearwardly from the open front of said head portion to receive the pointed, hooked extremity of a fish hook; a diagonal notch in the side of said body to receive at its upper extremity a leader extending from said hook; and a line slot extending from the lower extremity of said notch rearwardly through said tail portion to allow said leader to be passed into said body from said notch to a position projecting rearwardly from said tail.

2. A hook-protecting fishing item as described in claim 1 having a U-shaped resilient snap, one leg of the U being fixed in the open extremity of said head portion, the other leg of the U being resiliently clamped against the external surface of said head portion.

3. A hook-protecting fishing item as described in claim 1 having a longitudinal line slot extending forwardly in said tail into which the pointed, hooked extremity of said fish hook may be transferred so as to point outwardly from said body when said leader is connected to said hook within said body.

4. A hook-protecting fishing item as described in claim 3 having an enlargement in the extremity of said hook slot and a similar enlargement in the extremity of said second named line slot, and enlargements providing seats for said hook.

No references cited.

SAMUEL KOREN, *Primary Examiner.*